United States Patent
Lu et al.

(10) Patent No.: US 10,129,519 B2
(45) Date of Patent: Nov. 13, 2018

(54) NAKED-EYE THREE-DIMENSIONAL DISPLAY PROCESSING METHOD, NAKED-EYE THREE-DIMENSIONAL DISPLAY PROCESSING DEVICE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xue Dong, Beijing (CN); Renwei Guo, Beijing (CN); Wenqing Zhao, Beijing (CN); Chungchun Chen, Beijing (CN); Xiaochuan Chen, Beijing (CN); Ming Yang, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 304 days.

(21) Appl. No.: 14/909,608

(22) PCT Filed: Sep. 1, 2015

(86) PCT No.: PCT/CN2015/088708
§ 371 (c)(1),
(2) Date: Feb. 2, 2016

(87) PCT Pub. No.: WO2016/127630
PCT Pub. Date: Aug. 18, 2016

(65) Prior Publication Data
US 2016/0373716 A1     Dec. 22, 2016

(30) Foreign Application Priority Data

Feb. 10, 2015   (CN) .......................... 2015 1 0068319

(51) Int. Cl.
*H04N 13/122*     (2018.01)
*H04N 13/139*     (2018.01)
(Continued)

(52) U.S. Cl.
CPC ....... *H04N 13/122* (2018.05); *G02B 27/2214* (2013.01); *G09G 3/003* (2013.01);
(Continued)

(58) Field of Classification Search
CPC ....... G02B 27/2214; G09G 2300/0452; G09G 2320/0209; G09G 3/003; H04N 13/0018;
(Continued)

(56) References Cited

U.S. PATENT DOCUMENTS 5,966,167 A * 10/1999 Nose .................. G02B 27/0093
                                                            348/169
5,978,143 A * 11/1999 Spruck ............... G02B 27/2214
                                                            348/47

(Continued)

FOREIGN PATENT DOCUMENTS

CN    101507287 A    8/2009
CN    102413352 A    4/2012
(Continued)

OTHER PUBLICATIONS

First Office Action regarding Chinese application No. 201510068319. 2, dated Jul. 14, 2016. Translation provided by Dragon Intellectual Property Law Firm.
Written Opinion of the International Searching Authority for international application No. PCT/CN2015/088708.

*Primary Examiner* — Peter D Le
(74) *Attorney, Agent, or Firm* — Harness, Dickey & Pierce, P.L.C.

(57) ABSTRACT

A naked-eye 3D display processing method includes: receiving source display data for naked-eye 3D display; modifying the source display data, so as to acquire target display data including data corresponding to at least one subpixel separation sequence consisting of one or more consecutive subpixels in a dark state, two subpixels, which are arranged in a row identical to and adjacent to the subpixel separation sequence, corresponding to different views; and outputting the target display data to a display panel so as to display the target display data.

20 Claims, 9 Drawing Sheets

(51) Int. Cl.

| | | |
|---|---|---|
| H04N 13/144 | (2018.01) | |
| H04N 13/15 | (2018.01) | |
| H04N 13/302 | (2018.01) | |
| H04N 13/324 | (2018.01) | |
| H04N 13/383 | (2018.01) | |
| G09G 3/00 | (2006.01) | |
| G02B 27/22 | (2018.01) | |

(52) U.S. Cl.
CPC ......... *H04N 13/139* (2018.05); *H04N 13/144* (2018.05); *H04N 13/15* (2018.05); *H04N 13/302* (2018.05); *H04N 13/324* (2018.05); *H04N 13/383* (2018.05); *G09G 2300/0452* (2013.01); *G09G 2320/0209* (2013.01)

(58) Field of Classification Search
CPC ........... H04N 13/0029; H04N 13/0033; H04N 13/0037; H04N 13/0402; H04N 13/0422; H04N 13/0484
See application file for complete search history.

(56) References Cited

U.S. PATENT DOCUMENTS

| | | | | |
|---|---|---|---|---|
| 6,049,424 | A * | 4/2000 | Hamagishi | G02B 27/2214 |
| | | | | 345/419 |
| 2006/0170764 | A1* | 8/2006 | Hentschke | G02B 27/225 |
| | | | | 348/42 |
| 2012/0033145 | A1* | 2/2012 | Ko | G02B 27/26 |
| | | | | 349/13 |
| 2012/0154392 | A1* | 6/2012 | Kim | G02B 26/06 |
| | | | | 345/419 |
| 2013/0329022 | A1* | 12/2013 | Lee | H04N 13/0434 |
| | | | | 348/57 |
| 2014/0184660 | A1 | 7/2014 | Fujino et al. | |

FOREIGN PATENT DOCUMENTS

| | | |
|---|---|---|
| CN | 102628999 A | 8/2012 |
| CN | 103261946 A | 8/2013 |
| CN | 103369335 A | 10/2013 |
| CN | 104023222 A | 9/2014 |
| CN | 104597610 A | 5/2015 |
| WO | WO-2012-023492 A1 | 2/2012 |
| WO | WO-2014-181567 A1 | 11/2014 |

\* cited by examiner

NAKED-EYE THREE-DIMENSIONAL DISPLAY PROCESSING METHOD, NAKED-EYE THREE-DIMENSIONAL DISPLAY PROCESSING DEVICE AND DISPLAY DEVICE

CROSS-REFERENCE TO RELATED APPLICATION

The present application is the U.S. national phase of PCT Application No. PCT/CN2015/088708 filed on Sep. 1, 2015, which claims a priority of the Chinese patent application No.201510068319.2 filed on Feb. 10, 2015, which are incorporated herein by reference in their entirety.

TECHNICAL FIELD

The present disclosure relates to the field of display technology, in particular to a naked-eye three-dimensional (3D) display processing method, a naked-eye 3D display processing device and a display device.

BACKGROUND

Currently, there exist three stereoscopic display (i.e., 3D display) modes, i.e., a glass-type display mode, a head-mounted display mode and a naked-eye display mode. Various techniques may be adopted by the naked-eye display mode, and among them, a lenticular lens array technique and a parallax barrier technique are commonly used.

A naked-eye display system mainly includes a two-dimensional (2D) display device (including a liquid crystal display device, a plasma display device, a field-emission display device or an organic light-emitting (OLED) display device) and a beam splitter (e.g., a grating). The grating may include a slit grating and a cylindrical grating.

However, there is serious crosstalk for the existing naked-eye display system, so a field depth and a stereoscopic effect of the 3D display will be adversely affected.

SUMMARY

An object of the present disclosure is to provide a naked-eye 3D display processing method, a naked-eye 3D display processing device and a display device, so as to reduce the occurrence of crosstalk and Moire fringes of a stereoscopic display system.

In one aspect, the present disclosure provides in some embodiments a naked-eye 3D display processing method, including steps of: receiving source display data for naked-eye 3D display; modifying the source display data, so as to acquire target display data including data corresponding to at least one subpixel separation sequence consisting of one or more consecutive subpixels in a dark state, two subpixels, which are arranged in a row identical to and adjacent to the subpixel separation sequence, corresponding to different views; and outputting the target display data to a display panel so as to display the target display data.

Alternatively, each subpixel separation sequence includes one subpixel.

Alternatively, the number of the subpixels for displaying the views arranged between any two adjacent subpixel separation sequences in an identical row is the same.

Alternatively, the step of modifying the source display data so as to acquire the target display data includes: determining distribution information about the at least one subpixel separation sequence; generating first display data for enabling the at least one subpixel separation sequence to be in the dark state during the display; and replacing data in the source display data corresponding to the at least one subpixel separation sequence with the first display data, so as to acquire the target display data.

Alternatively, the step of modifying the source display data so as to acquire the target display data includes: determining distribution information about the at least one subpixel separation sequence; generating first display data for enabling the at least one subpixel separation sequence to be in the dark state during the display; processing display data corresponding to a subpixel display sequence between the adjacent subpixel separation sequences with a rendering algorithm, so as to generate second display data; and replacing data in the source display data corresponding to the at least one subpixel separation sequence and data corresponding to the subpixel display sequence with the first display data and the second display data respectively, so as to acquire the target display data.

Alternatively, the naked-eye 3D display processing method further includes: detecting viewing positions of a left eye and a right eye of a user; and determining the at least one subpixel separation sequence in accordance with the viewing positions.

Alternatively, for a pixel arrangement design, nine subpixels arranged in a 3*3 matrix form are used as a display sub-unit, the subpixels in each row include a red subpixel, a green subpixel and a blue subpixel, and the subpixels in each column include a red subpixel, a green subpixel and a blue subpixel.

Alternatively, the display sub-unit is of a structure selected from the group consisting of: RGB/BRG/GBR, RGB/GBR/BRG, RBG/GRB/BGR, RBG/BGR/GRB, GBR/RGB/BRG, GBR/BRG/RGB, GRB/RBG/BGR, GRB/BGR/RBG, BRG/RGB/GBR, BRG/GBR/RGB, and BGR/RBG/GRB. R represents a red subpixel, G represents a green subpixel and B represents a blue subpixel.

In another aspect, the present disclosure provides in some embodiments a naked-eye 3D display processing device, including: a reception module configured to receive source display data for naked-eye 3D display; a modification module configured to modify the source display data, so as to acquire target display data including data corresponding to at least one subpixel separation sequence consisting of one or more consecutive subpixels in a dark state, two subpixels, which are arranged in a row identical to and adjacent to the subpixel separation sequence, corresponding to different views; and an output module configured to output the target display data to a display panel so as to display the target display data.

Alternatively, each subpixel separation sequence includes one subpixel.

Alternatively, the number of the subpixels for displaying the views arranged between any two adjacent subpixel separation sequences in an identical row is the same.

Alternatively, the modification module includes: a determination unit configured to determine distribution information about the at least one subpixel separation sequence; a first generation unit configured to generate first display data for enabling the at least one subpixel separation sequence to be in the dark state during the display; and a first replacement unit configured to replace data in the source display data corresponding to the at least one subpixel separation sequence with the first display data, so as to acquire the target display data.

Alternatively, the modification module includes: a determination unit configured to determine distribution information about the at least one subpixel separation sequence; a first generation unit configured to generate first display data for enabling the at least one subpixel separation sequence to be in the dark state during the display; a second generation unit configured to process display data corresponding to a subpixel display sequence between the adjacent subpixel separation sequences with a rendering algorithm, so as to generate second display data; and a second replacement unit configured to replace data in the source display data corresponding to the at least one subpixel separation sequence and data corresponding to the subpixel display sequence with the first display data and the second display data respectively, so as to acquire the target display data.

Alternatively, the naked-eye 3D display processing device further includes: a detection module configured to detect viewing positions of a left eye and a right eye of a user; and a determination module configured to determine the at least one subpixel separation sequence in accordance with the viewing positions.

In yet another aspect, the present disclosure provides in some embodiments a display device including the above-mentioned naked-eye 3D display processing device.

According to the embodiments of the present disclosure, the source display data is modified so as to acquire the target display data, and when displaying the target display data, one or more consecutive subpixels in the dark state are arranged between any two adjacent subpixel sequences corresponding to different views. Due to the existence of the subpixels in the dark state, it is able to increase a very small distance between the subpixel sequences for displaying different views in the related art (this small distance is at a level approximately equal to a width of a data line) to a level equal to a width of a pixel, thereby to reduce the occurrence of the crosstalk and Moire fringes during the 3D display.

BRIEF DESCRIPTION OF THE DRAWINGS

FIG. 8A is a schematic view showing a subpixel sequence arrangement mode according to one embodiment of the present disclosure;

FIG. 8B is a schematic view showing the subpixel sequence arrangement on an array substrate obtained in accordance with the subpixel sequence arrangement mode in FIG. 8A.

DETAILED DESCRIPTION OF THE EMBODIMENTS

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a naked-eye 3D display processing method, a naked-eye 3D display processing device and a display device, where source display data is modified so as to acquire target display data. As a result, when displaying an image on the basis of the target display data, a portion of subpixels is controlled to be in a dark state, so as to increase a distance between subpixel sequences correspond to different views, thereby to reduce the occurrence of crosstalk and Moire fringes.

Figure 1:
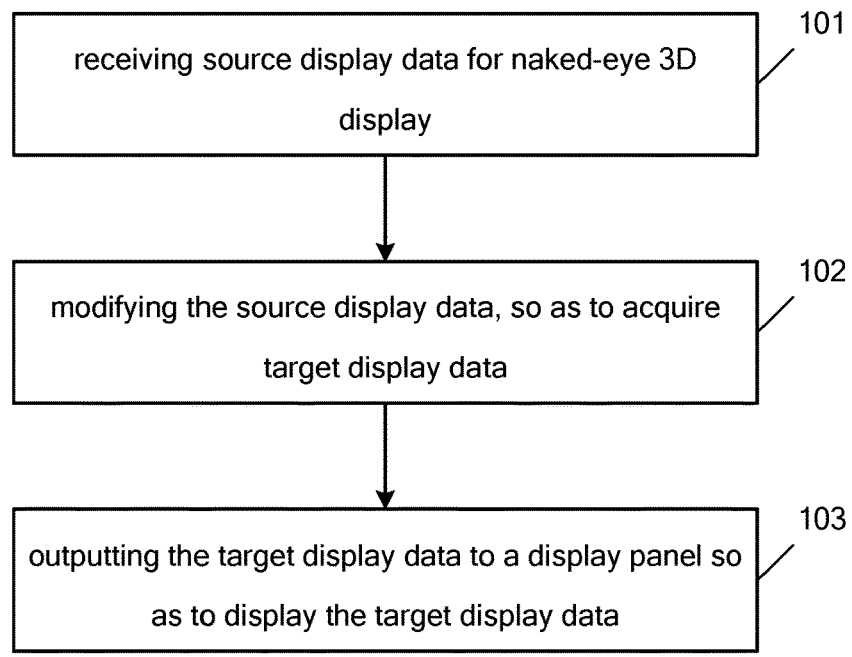
FIG. 1 is a flow chart of a naked-eye 3D display processing method according to one embodiment of the present disclosure.

As shown in FIG. 1, the naked-eye 3D display processing method includes: Step 101 of receiving source display data for naked-eye 3D display; Step 102 of modifying the source display data, so as to acquire target display data including data corresponding to at least one subpixel separation sequence consisting of one or more consecutive subpixels in a dark state when displaying an image on a display panel on the basis of the target display data, two subpixels, which are arranged in a row identical to and adjacent to the subpixel separation sequence, corresponding to different views; and Step 103 of outputting the target display data to a display panel so as to display the target display data.

Usually, the display panel includes an array substrate provided with the subpixels in a plurality of rows. Regardless of the arrangement modes, during the 3D display processing in the related art, the subpixels in each row may include a plurality of subpixel sequences arranged sequentially. The subpixels in each subpixel sequence correspond to an identical view, and the adjacent subpixel sequences correspond to different views.

Hence, in accordance with an existing design for the display panel, a maximum distance between the adjacent subpixel sequences in a row direction is approximately equal to a width of a data line, and as compared with a width of a pixel, this maximum distance almost turns out to be negligible.

Figure 2A:
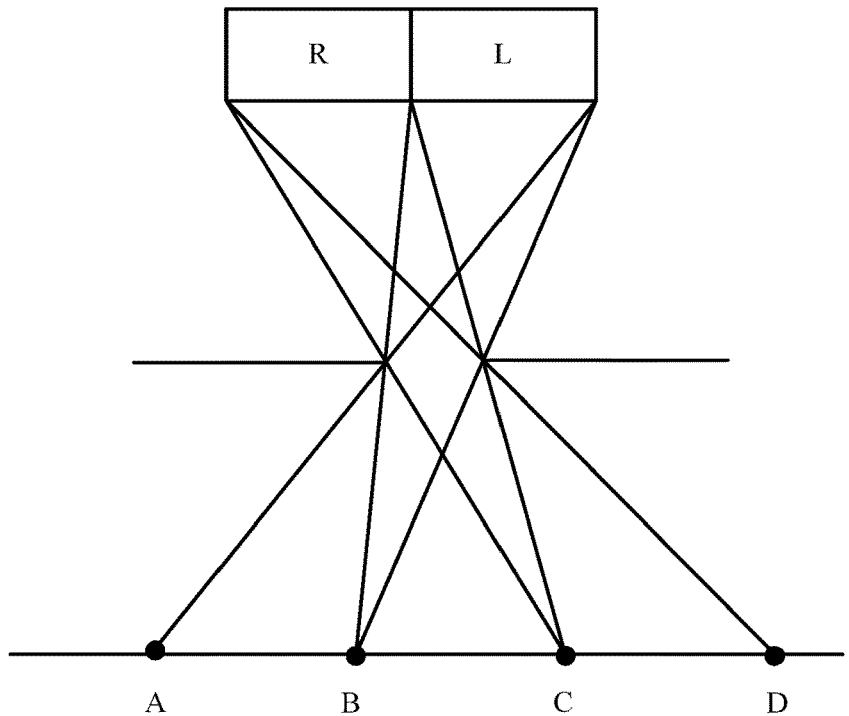
FIG. 2A is a schematic view showing crosstalk generated in the case of a first distance between subpixel display sequences for displaying different views.

As shown in FIG. 2A, the two-view-based 3D display is taken as an example, where R represents a subpixel sequence (including one subpixel or more adjacent subpixels) for a right view and L represents a subpixel sequence (including one subpixel or more adjacent subpixels) for a left view. When an existing display mode is adopted, it is found that merely a left-eye image may be viewed at a region AB, merely a right-eye image may be viewed at a region CD, and both the left-eye image and the right-eye image may be viewed at a region BC. In other words, there exists the crosstalk at the region BC.

The following description is given when the distance between R and L is increased (for convenience, R is moved by a certain distance to the left and L remains unchanged).

Figure 2B:
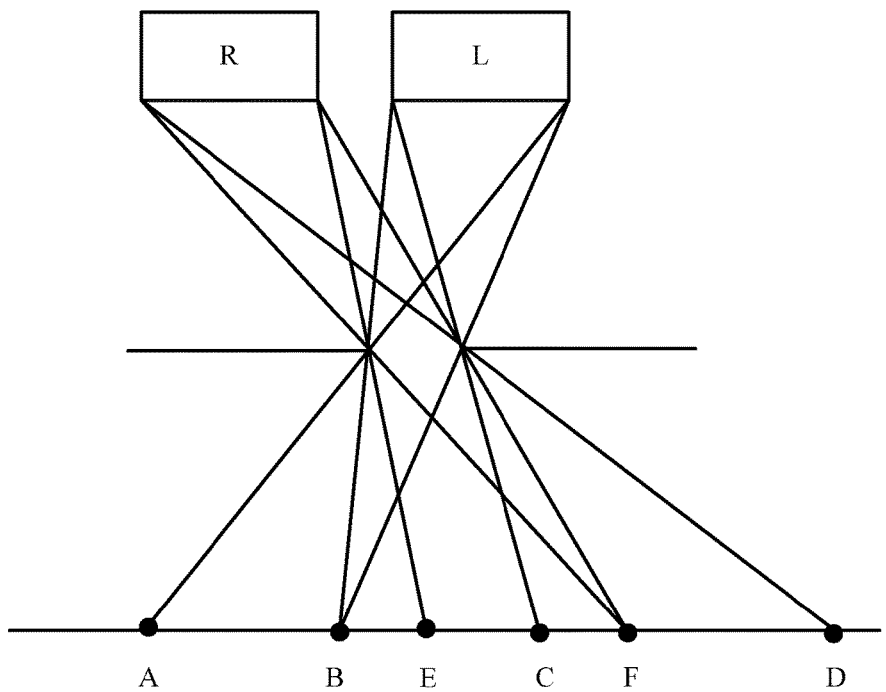
FIG. 2B is a schematic view showing the crosstalk generated when the distance between the subpixel display sequences for display different views is increased.

As shown in FIG. 2B, when L is maintained at its position, the left-eye image may still be viewed at a region ABEC, while the right-eye image may be viewed at a region ECFD. As compared with FIG. 2A, it is equivalent to that the region where the right-eye image may be viewed moves to the right, so the region where both the left-eye image and the right-eye image may be viewed is changed from the original region BC to a region EC.

It is found that, when the distance between the subpixel sequences for displaying different views are increased, the region where both the left-eye image and the right-eye image, i.e., the region where there exists the crosstalk, will become smaller.

According to the naked-eye 3D display processing method in the embodiments of the present disclosure, the source display data is modified so as to acquire the target display data. When displaying the target display data, one or more consecutive subpixels in the dark state occur between any two adjacent subpixel sequences corresponding to different views. Due to the existence of the subpixels in the dark state, it is able to increase a very small distance between the subpixel sequences for displaying different views in the related art (this small distance is at a level approximately equal to a width of a data line) to a level equal to a width of a pixel. Based on the above analysis, when the distance between the subpixel sequences for displaying different views is increased, it is able to reduce the occurrence of the crosstalk and Moire fringes.

In a word, according to the naked-eye 3D display processing method in the embodiments of the present disclosure, it is able to reduce the occurrence of the crosstalk and Moire fingers during the 3D display.

The above description is given on the basis of two views. Of course, the naked-eye 3D display processing method may also be applicable to the 3D display on the basis of N views (N is greater than or equal to 3), and the details are given as follows.

Any image forming device capable of achieving the 3D display using the display data about a plurality of views (e.g., a liquid crystal display device, a plasma display device, a field-emission display device and an OLED display device) includes a plurality of subpixels.

Figure 3:
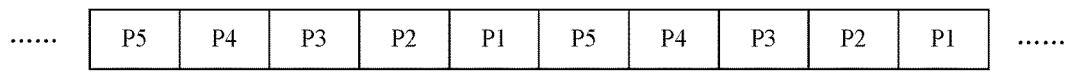
FIG. 3 is a schematic view showing the subpixels in each row divided into N types based on a spatial-multiplexing stereoscopic display mode.

As shown in FIG. 3, the subpixels in each row are divided into N types (five types in FIG. 3) on the basis of a spatial-multiplexing stereoscopic display mode (where both the left-eye and right-eye images are displayed simultaneously in such manner that the pixels are staggered each other, and a special light control technique is used to enable the left and right eyes of a user to view different images). Every N subpixels are grouped into a set, and these subpixels are arranged periodically so as to display N views.

The N-view-based stereoscopic display system (N is greater than or equal to 3) differs from the two-view-based stereoscopic display system merely in the number of the images, but the arrangement mode of the subpixels in each row is completely the same. That is, the subpixels in each row may be divided into a plurality of subpixel sequences in accordance with the number of the views, the subpixels in each subpixel sequence correspond to an identical view, and the adjacent subpixel sequences correspond to different views. Hence, the method in the embodiments of the present disclosure may also be used to provide the subpixel sequence in a dark state between the adjacent subpixel sequences corresponding to different views, so as to reduce the occurrence of the crosstalk and Moire fringes.

The method in the embodiments of the present disclosure will be described hereinafter.

Figure 4A:
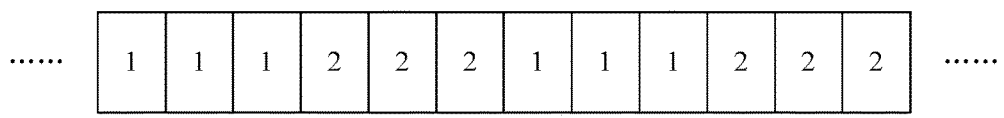
FIG. 4A is a schematic view showing an existing view data arrangement mode during the two-view-based 3D display.

The two-view-based 3D display is taken as an example. FIG. 4A shows the image displayed on the basis of the source display data, while FIGS. 4B-4H show the image displayed on the basis of the target display data. It is found that, when the method in the embodiments of the present disclosure is adopted, there is at least one subpixel in a dark state (i.e., the subpixel(s) filled with slashes) between any two adjacent subpixel sequences corresponding to different views, so that the distance between any adjacent subpixel sequences corresponding to different views is at least greater than a width of one subpixel.

Figure 4B:
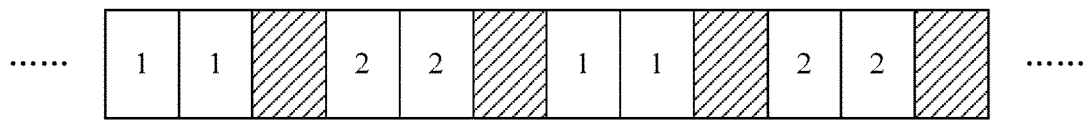
FIGS. 4B-4H are schematic views showing the distribution of subpixel separation sequences according to one embodiment of the present disclosure.

As shown in FIGS. 4B-4F, any adjacent subpixel sequences corresponding to different views are spaced apart from each other by a width of one subpixel. As shown in FIG. 4G, any adjacent subpixel sequences corresponding to different views are spaced apart from each other by a width of two subpixels. As shown in FIG. 4H, parts of the adjacent subpixel sequences corresponding to different views are spaced apart from each other by a width of one subpixel, while parts of the adjacent subpixel sequences corresponding to different views are spaced apart from each other by a width of two subpixels.

In other words, the number of the subpixels in each subpixel sequence in a dark state is not particularly defined herein. However, by comparing FIG. 4B with FIG. 4G, it is found that, the number of the subpixels for displaying the views in FIG. 4B is greater than the number of the subpixels for displaying the views in FIG. 4G. In order to attenuate the influence on the image display, in the embodiments of the present disclosure, each subpixel sequence may merely include one subpixel in the dark state.

Meanwhile, a small brightness difference between different views shall be provided as possible, e.g., the subpixels at an identical amount may be used for each view.

By comparing FIGS. 4E-4H with FIG. 4B, it is found that, the number of the subpixels corresponding to different views in FIGS. 4E-4H is different, while the number of the subpixels corresponding to different views in FIG. 4B is the same (there are two subpixels). In order to provide a small brightness difference between the views, in an alternative embodiment of the present disclosure, the number of the subpixels for displaying the views arranged between any two adjacent subpixel separation sequences in an identical row is the same.

As mentioned above, the method in the embodiments of the present disclosure may also be used for the N-view-based 3D display (N is greater than or equal to 3). The following description is given by taking the four-view-based 3D display as an example.

Figure 5A:
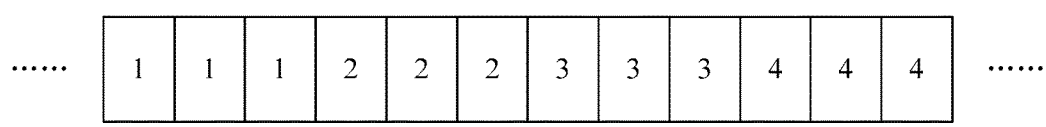
FIG. 5A is a schematic view showing an existing view data arrangement mode during the four-view-based 3D display.

FIG. 5A shows an image displayed on the basis of the source display data, while FIGS. 5B-5F show an image displayed on the basis of the target display data. It is found that, when the method in the embodiments of the present disclosure is adopted, there is at least one subpixel in a dark state between any two adjacent subpixel sequences corresponding to different views, so that a distance between the adjacent subpixel sequences corresponding to different views is at least greater than a width of one subpixel.

Figure 5B:
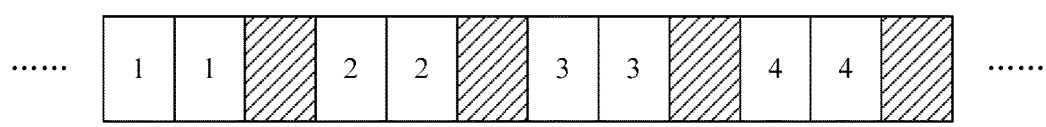
FIGS. 5B-5F are schematic views showing the distribution of the subpixel separation sequences according to one embodiment of the present disclosure.
Figure 5C:
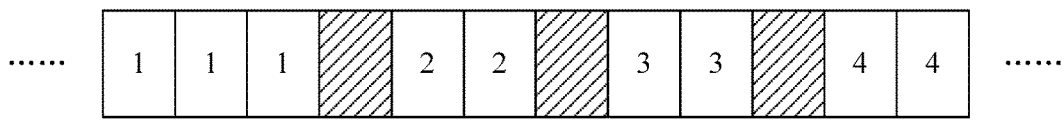

As shown in FIGS. 5B-5E, any adjacent subpixel sequences corresponding to different views are spaced apart from each other by a width of one subpixel. As shown in FIG. 5F, parts of the adjacent subpixel sequences corresponding to different views are spaced apart from each other by a width of one subpixel, while parts of the adjacent subpixel sequences corresponding to different views are spaced apart from each other by a width of two subpixels. The number of the subpixels for displaying the views in FIGS. 5B and 5C is greater than the number of the subpixels for displaying the views in FIG. 5F. In order to attenuate the influence on the image display, in the embodiments of the present disclosure, each subpixel sequence may merely include one subpixel in the dark state.

Meanwhile, a small brightness difference between different views shall be provided as possible, e.g., the subpixels at an identical amount may be used for each view.

Figure 5D:
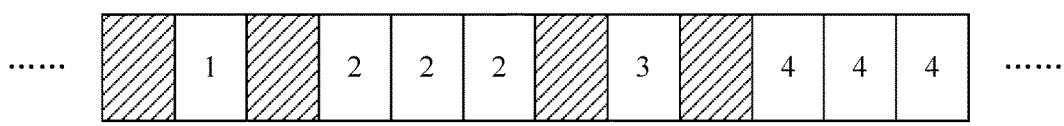
Figure 5E:
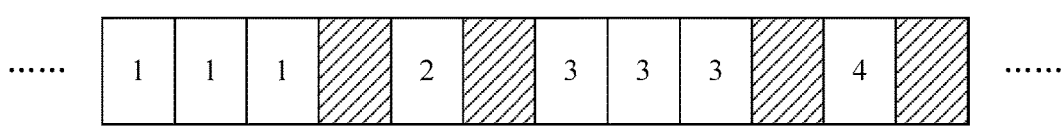
Figure 5F:
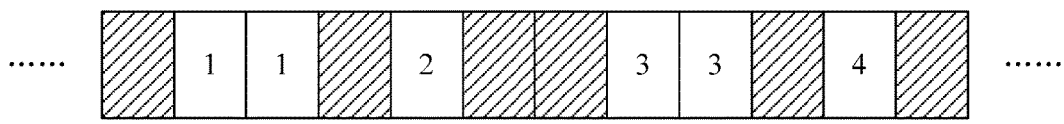

By comparing FIG. 5B with FIG. 5D, it is found that, the number of the subpixels corresponding to different views in FIG. 5B is the same (there are two subpixels), while the number of the subpixels corresponding to different views in FIG. 5D is different. In order to provide a small brightness difference between the views, in an alternative embodiment of the present disclosure, the number of the subpixels for displaying the views arranged between any two adjacent subpixel separation sequences in an identical row is the same.

In an alternative embodiment of the present disclosure, it is required to modify the source display data, so as to acquire the target display data. When displaying an image on the basis of the target display data, the following conditions need to be met.

Firstly, at least one subpixel in the subpixel sequences in the source display data corresponding to each view may be reserved for displaying an original view. For example, as shown in FIGS. 4B-4H and FIGS. 5B-5F, each subpixel sequence in the source display data includes three subpixels, and in the target display data, at least one of these three subpixels is still used for displaying the corresponding view.

Secondly, in the target display data, there is one subpixel separation sequence (including one or more consecutive subpixels in a dark state) between the adjacent subpixel sequences corresponding to different views.

Figure 6:
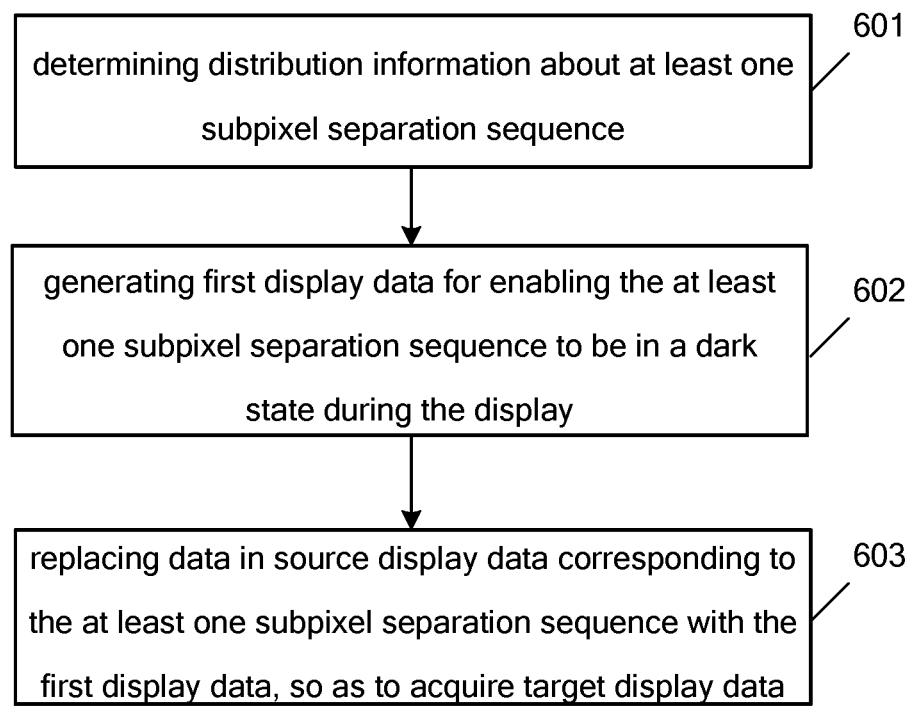
FIG. 6 is a flow chart of a step of modifying source display data to acquire target display data according to one embodiment of the present disclosure.

The modification of the data satisfying the above two conditions may be implemented by data replacement. As shown in FIG. 6, the step of modifying the source display data so as to acquire the target display data may include Step 601 of determining distribution information about the at least one subpixel separation sequence, Step 602 of generating first display data for enabling the at least one subpixel separation sequence to be in the dark state during the display, and Step 603 of replacing data in the source display data corresponding to the at least one subpixel separation sequence with the first display data, so as to acquire the target display data.

In this way, after determining the distribution information about the subpixel separation sequence, it is able to replace the data corresponding to a view with the data for enabling the subpixel to be in the dark state, thereby to enable the subpixel in the subpixel separation sequence to be in the dark state when displaying the image on the basis of the target display data.

This mode may be easily implemented, so it is able to remarkably reduce the cost for the naked-eye 3D display processing method in the embodiments of the present disclosure.

The following description is given in conjunction with FIGS. 5A-5F.

FIG. 5A shows the image displayed on the basis of the source display data. It is found that, the subpixels in each row are divided into four subpixel sequences A, B, C and D which arranged periodically. The subpixel sequences A, B, C and D each include three subpixels. In addition, the subpixel sequences A, B, C and D are arranged sequentially and correspond to different views.

As mentioned above, in each of the subpixel sequences A, B, C and D, the number of the subpixels forming each subpixel separation sequence shall be less than 3, i.e., 0, 1 or 2. In addition, two subpixels adjacent to each subpixel separation sequence are still used to display views, but the views displayed by them are different from each other.

Based on the above two principles, FIGS. 5B-5F show the possible arrangement modes of the subpixel separation sequence.

After the distribution information about the subpixel separation sequences is determined, it is merely required to find and replace the data in the source display data corresponding to the subpixel separation sequences.

In the embodiments of the present disclosure, when the subpixel originally used for displaying a view is replaced with the subpixel in a dark state, the number of the subpixels for display views will be decrease. When the distribution of the subpixels is not changed, a distorted view may be provided and thus the 3D display effect may be attenuated.

In order to improve the 3D display effect, in the embodiments of the present disclosure, after the subpixel originally used for displaying a view is replaced with the subpixel in a dark state, the display data corresponding to the remaining subpixels (which are located between the subpixel separation sequences and form a plurality of subpixel display sequences) may be adjusted, so as to prevent the 3D display effect from being adversely affected due to a decrease in the number of the subpixels for displaying the views.

Figure 7:
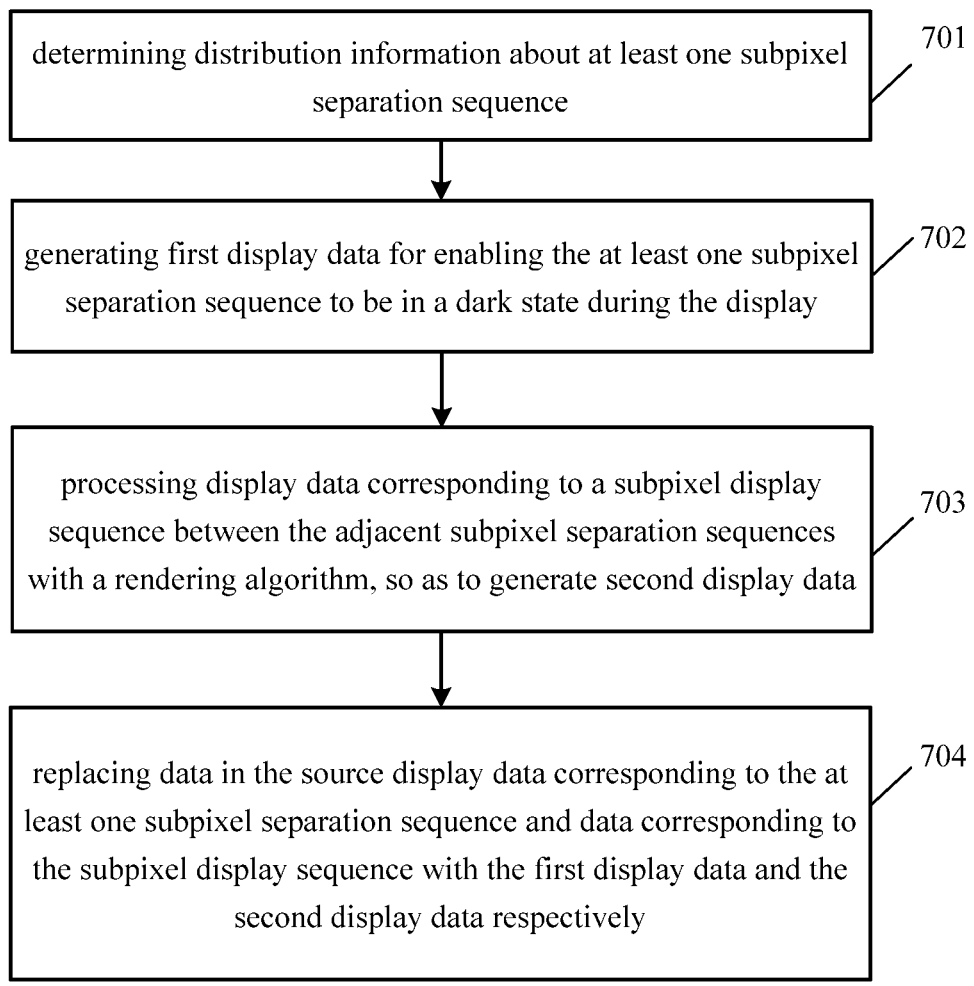
FIG. 7 is another flow chart of the step of modifying the source display data to acquire the target display data according to one embodiment of the present disclosure.

In this case, as shown in FIG. 7, the step of modifying the source display data so as to acquire the target display data may include Step 701 of determining distribution information about the at least one subpixel separation sequence, Step 702 of generating first display data for enabling the at least one subpixel separation sequence to be in the dark state during the display, Step 703 of processing the display data corresponding to a subpixel display sequence between the adjacent subpixel separation sequences with a rendering algorithm, so as to generate second display data, and Step 704 of replacing data in the source display data corresponding to the at least one subpixel separation sequence and data corresponding to the subpixel display sequence with the first display data and the second display data respectively, so as to acquire the target display data.

In an alternative embodiment of the present disclosure, after the subpixel originally used for displaying a view is replaced with the subpixel in a dark state, the display data corresponding to the subpixel sequences between the subpixel separation sequence is rendered, and the display data corresponding to subpixel sequences is replaced with the rendered display data, so as to improve the display effect.

In the field of image processing technology, when an image, which used to be represented with more subpixels, is required to be represented with fewer subpixels or pixels, the image may be processed by a rendering technique. More details will be given as follows.

Figures 8A, 8B:
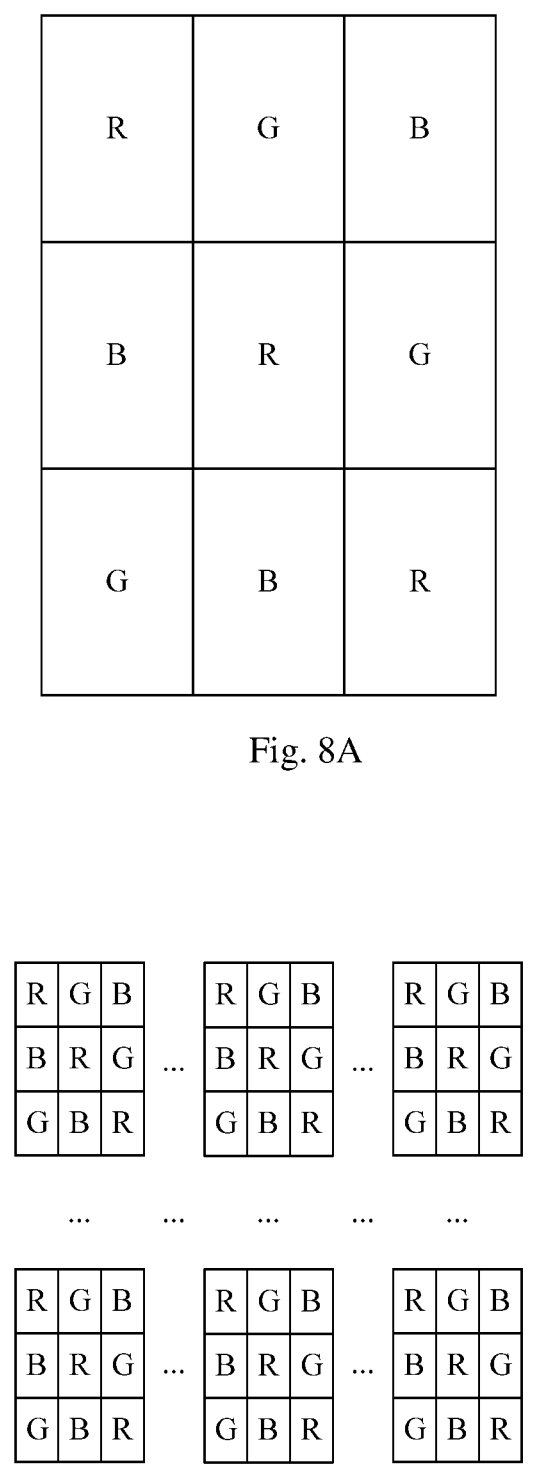

In an alternative embodiment of the present disclosure, when some subpixels are modified into black ones, it is required to render the subpixels adjacent to these subpixels and in an identical color, so as to compensate for the color and brightness losses due to the modification. For example, as shown in FIG. 8A, when the subpixels in a second column are selected as the subpixel separation sequence, the subpixels G, R and B cannot be used for the normal display any more. At this time, the green subpixels in a second row may be rendered so as to compensate for the color loss due to the modification to the green subpixel in a first row, the red subpixels in the first and second rows may be rendered so as to compensate for the color loss due to the modification to the red subpixel in the second row, and so on. Through the above-mentioned subpixel rendering algorithm, it is able to ensure the display effect while reducing the occurrence of the crosstalk and Moire fringes.

In the embodiments of the present disclosure, the positions of the subpixel separation sequences arranged in an identical mode (where each subpixel separation sequence includes only one subpixel and the adjacent subpixel separation sequences are spaced apart from each other by an identical distance) may be different. For example, when the subpixel separation sequences in FIG. 4B are moved to the right by a width of one subpixel, the arrangement mode for the subpixel separation sequences in FIG. 4C may be obtained.

Figure 4C:
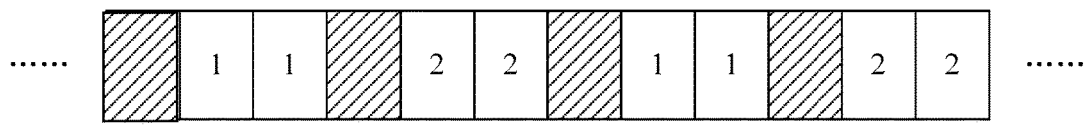
Figure 4D:
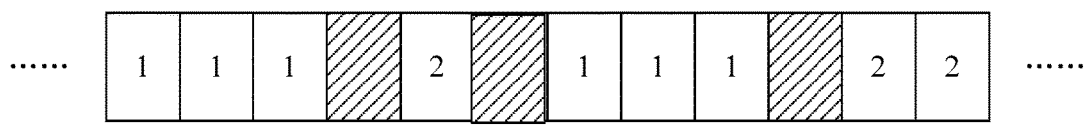
Figure 4E:
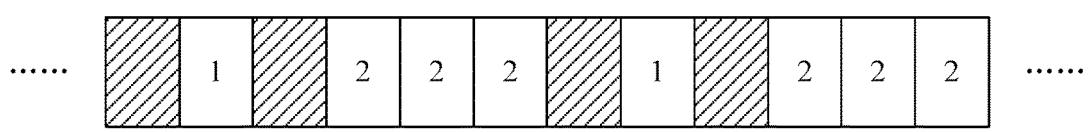
Figure 4F:
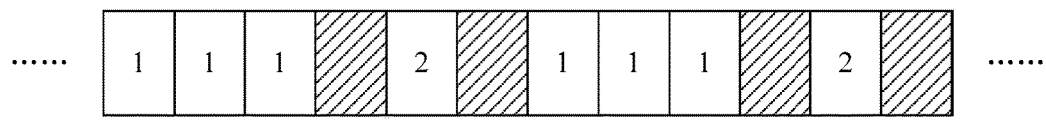
Figure 4G:
Figure 4H:

According to the arrangement modes for the subpixel separation sequences in FIGS. 4B and 4C, it is able to increase the distance between the subpixel sequences corresponding to different views, thereby to reduce the occurrence of crosstalk.

In the embodiments of the present disclosure, after the source display data has been determined, it is able to determine any possible arrangement mode for the subpixel separation sequences in accordance with the distribution of the subpixels corresponding to different views in the source display data, and maintain the arrangement mode during the display.

However, in order to improve the flexibility, in an alternative embodiment of the present disclosure, the positions of the subpixel separation sequences may be adjusted in accordance with a position of the user, so as to improve the separation effect. More details will be given as follows.

In order to achieve the 3D display effectively, usually the image with different viewpoints need to be viewed by the left eye and the right eye of the user respectively.

In an alternative embodiment of the present disclosure, the display processing method may further include detecting viewing positions of the left eye and the right eye of the user, and determining the at least one subpixel separation sequence in accordance with the viewing positions.

The viewing positions of the user's left eye and right eye may be determined using any methods known in the art, which are not particularly defined herein.

According to the embodiment of the present disclosure, it is able to select the most appropriate one from various possible arrangement modes of the subpixel separation sequences in accordance with the viewing positions, thereby to improve the separation effect of the subpixel separation sequences.

The method in the embodiments of the present disclosure may be applicable to various display panels capable of achieving the naked-eye 3D display, but the 3D display effect may be significantly affected by the subpixel design of the display panel.

In the embodiments of the present disclosure, an appropriate subpixel arrangement mode is provided.

As shown in FIG. 8A, for a pixel arrangement design, nine subpixels arranged in a 3*3 matrix form are used as a display sub-unit, the subpixels in each row include a red subpixel, a green subpixel and a blue subpixel, and the subpixels in each column include a red subpixel, a green subpixel and a blue subpixel.

FIG. 8B shows the subpixel arrangement mode for an array substrate including the display sub-units in FIG. 8A. It should be appreciated that, the subpixel arrangement mode may be applicable to a display panel in a portrait mode or a landscape mode.

Of course, FIGS. 8A and 8B merely relate to one structure of the display sub-unit, and the display sub-unit may also be of a structure selected from the group consisting of RGB/GBR/BRG, RBG/GRB/BGR, RBG/BGR/GRB, GBR/RGB/BRG, GBR/BRG/RGB, GRB/RBG/BGR, GRB/BGR/RBG, BRG/RGB/GBR, BRG/GBR/RGB, BGR/RBG/GRB, and BGR/GRB/RBG.

For an existing subpixel arrangement mode where the subpixels in an identical color are arranged in an identical column, all the subpixels in an identical color may be selected to form the subpixel separation sequence, and at this time, it is impossible to perform the subpixel rendering. However, this drawback will be overcome using the above-mentioned subpixel arrangement modes.

Figure 9:
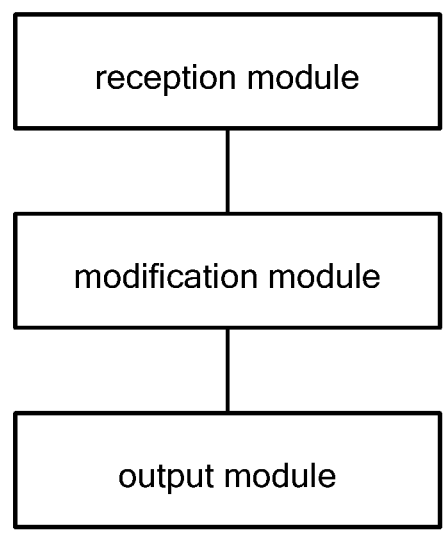
FIG. 9 is a schematic view showing a naked-eye 3D display processing device according to one embodiment of the present disclosure.

The present disclosure further provides a naked-eye 3D display processing device which, as shown in FIG. 9, may include: a reception module configured to receive source display data for naked-eye 3D display; a modification module configured to modify the source display data, so as to acquire target display data including data corresponding to at least one subpixel separation sequence consisting of one or more consecutive subpixels in a dark state, two subpixels, which are arranged in a row identical to and adjacent to the subpixel separation sequence, corresponding to different views; and an output module configured to output the target display data to a display panel so as to display the target display data.

Alternatively, each subpixel separation sequence includes one subpixel.

Alternatively, the number of the subpixels for displaying the views arranged between any two adjacent subpixel separation sequences in an identical row is the same.

Alternatively, the modification module includes: a determination unit configured to determine distribution information about the at least one subpixel separation sequence; a first generation unit configured to generate first display data for enabling the at least one subpixel separation sequence to be in the dark state during the display; and a first replacement unit configured to replace data in the source display data corresponding to the at least one subpixel separation sequence with the first display data, so as to acquire the target display data.

Alternatively, the modification module includes: a determination unit configured to determine distribution information about the at least one subpixel separation sequence; a first generation unit configured to first display data for enabling the at least one subpixel separation sequence to be in the dark state during the display; a second generation unit configured to process the display data corresponding to a subpixel display sequence between the adjacent subpixel separation sequences with a rendering algorithm, so as to generate second display data; and a second replacement unit configured to replace data in the source display data corresponding to the at least one subpixel separation sequence and data corresponding to the subpixel display sequence with the first display data and the second display data respectively, so as to acquire the target display data.

Alternatively, the naked-eye 3D display processing device further includes: a detection module configured to detect viewing positions of a left eye and a right eye of a user; and a determination module configured to determine the at least one subpixel separation sequence in accordance with the viewing positions.

The present disclosure further provides in some embodiments a display device including the above-mentioned naked-eye 3D display processing device. The display device may be any product of member having a display function, such as a liquid crystal panel, a mobile phone, a flat-panel computer, a television, a display, a laptop computer, a digital photo frame or a navigator. The implementation of the display device may refer to that of the naked-eye 3D display processing device, and thus will not be particularly defined herein.

The above are merely the preferred embodiments of the present disclosure. It should be appreciated that, a person skilled in the art may make further medications and improvements without departing from the principle of the present disclosure, and these modifications and improvements shall also fall within the scope of the present disclosure.

What is claimed is:

1. A naked-eye three-dimensional (3D) display processing method, comprising steps of:
    receiving source display data for naked-eye 3D display;
    modifying the source display data, so as to acquire target display data including data corresponding to at least two subpixel separation sequences each consisting of one or more consecutive subpixels in a dark state, two subpixels, which are arranged in a row identical to and adjacent to the at least two subpixel separation sequences, corresponding to different views; and
    outputting the target display data to a display panel so as to display the target display data,
    wherein there are at most two subpixels arranged between two adjacent subpixels separation sequences.

2. The naked-eye 3D display processing method according to claim 1, wherein each subpixel separation sequence comprises one subpixel.

3. The naked-eye 3D display processing method according to claim 2, wherein the step of modifying the source display data so as to acquire the target display data comprises:
    determining distribution information about the at least two subpixel separation sequences;
    generating first display data for enabling the at least two subpixel separation sequences to be in the dark state during the display; and
    replacing data in the source display data corresponding to the at least two subpixel separation sequences with the first display data, so as to acquire the target display data.

4. The naked-eye 3D display processing method according to claim 2, wherein the step of modifying the source display data so as to acquire the target display data comprises:
    determining distribution information about the at least two subpixel separation sequences;
    generating first display data for enabling the at least two subpixel separation sequences to be in the dark state during the display;
    processing display data corresponding to a subpixel display sequence between the two adjacent subpixel separation sequences with a rendering algorithm, so as to generate second display data; and
    replacing data in the source display data corresponding to the at least two subpixel separation sequences and data corresponding to the subpixel display sequence with the first display data and the second display data respectively, so as to acquire the target display data.

5. The naked-eye 3D display processing method according to claim 2, further comprising:
    detecting viewing positions of a left eye and a right eye of a user; and
    determining the at least two subpixel separation sequences in accordance with the viewing positions.

6. The naked-eye 3D display processing method according to claim 1, wherein a number of the subpixels for displaying the views arranged between any two adjacent subpixel separation sequences in an identical row is the same.

7. The naked-eye 3D display processing method according to claim 6, wherein the step of modifying the source display data so as to acquire the target display data comprises:
    determining distribution information about the at least two subpixel separation sequences;
    generating first display data for enabling the at least two subpixel separation sequences to be in the dark state during the display; and
    replacing data in the source display data corresponding to the at least two subpixel separation sequences with the first display data, so as to acquire the target display data.

8. The naked-eye 3D display processing method according to claim 6, wherein the step of modifying the source display data so as to acquire the target display data comprises:
    determining distribution information about the at least two subpixel separation sequences;
    generating first display data for enabling the at least two subpixel separation sequences to be in the dark state during the display;
    processing display data corresponding to a subpixel display sequence between the two adjacent subpixel separation sequences with a rendering algorithm, so as to generate second display data; and
    replacing data in the source display data corresponding to the at least two subpixel separation sequences and data corresponding to the subpixel display sequence with the first display data and the second display data respectively, so as to acquire the target display data.

9. The naked-eye 3D display processing method according to claim 1, wherein the step of modifying the source display data so as to acquire the target display data comprises:
    determining distribution information about the at least two subpixel separation sequences;
    generating first display data for enabling the at least two subpixel separation sequences to be in the dark state during the display; and
    replacing data in the source display data corresponding to the at least two subpixel separation sequences with the first display data, so as to acquire the target display data.

10. The naked-eye 3D display processing method according to claim 1, wherein the step of modifying the source display data so as to acquire the target display data comprises:
- determining distribution information about the at least two subpixel separation sequences;
- generating first display data for enabling the at least two subpixel separation sequences to be in the dark state during the display;
- processing display data corresponding to a subpixel display sequence between the two adjacent subpixel separation sequences with a rendering algorithm, so as to generate second display data; and
- replacing data in the source display data corresponding to the at least two subpixel separation sequences and data corresponding to the subpixel display sequence with the first display data and the second display data respectively, so as to acquire the target display data.

11. The naked-eye 3D display processing method according to claim 1, further comprising:
- detecting viewing positions of a left eye and a right eye of a user; and
- determining the at least two subpixel separation sequences in accordance with the viewing positions.

12. The naked-eye 3D display processing method according to claim 1, wherein for a pixel arrangement design, nine subpixels arranged in a 3*3 matrix form are used as a display sub-unit, the subpixels in each row comprise a red subpixel, a green subpixel and a blue subpixel, and the subpixels in each column comprise a red subpixel, a green subpixel and a blue subpixel.

13. The naked-eye 3D display processing method according to claim 12, wherein the display sub-unit is of a structure selected from the group consisting of RGB/BRG/GBR, RGB/GBR/BRG, RBG/GRB/BGR, RBG/BGR/GRB, GBR/RGB/BRG, GBR/BRG/RGB, GRB/RBG/BGR, GRB/BGR/RBG, BRG/RGB/GBR, BRG/GBR/RGB, and BGR/RBG/GRB, and wherein R represents a red subpixel, G represents a green subpixel and B represents a blue subpixel.

14. A naked-eye three-dimensional (3D) display processing device, comprising:
- a reception module configured to receive source display data for naked-eye 3D display;
- a modification module configured to modify the source display data, so as to acquire target display data including data corresponding to at least two subpixel separation sequences each consisting of one or more consecutive subpixels in a dark state, two subpixels, which are arranged in a row identical to and adjacent to the at least two subpixel separation sequences, corresponding to different views; and
- an output module configured to output the target display data to a display panel so as to display the target display data,
wherein there are at most two subpixels arranged between two adjacent subpixels separation sequences.

15. The naked-eye 3D display processing device according to claim 14, wherein each subpixel separation sequence comprises one subpixel.

16. The naked-eye 3D display processing device according to claim 14, wherein a number of the subpixels for displaying the views arranged between any two adjacent subpixel separation sequences in an identical row is the same.

17. The naked-eye 3D display processing device according to claim 14, wherein the modification module comprises:
- a determination unit configured to determine distribution information about the at least two subpixel separation sequences;
- a first generation unit configured to generate first display data for enabling the at least two subpixel separation sequences to be in the dark state during the display; and
- a first replacement unit configured to replace data in the source display data corresponding to the at least two subpixel separation sequences with the first display data, so as to acquire the target display data.

18. The naked-eye 3D display processing device according to claim 14, wherein the modification module comprises:
- a determination unit configured to determine distribution information about the at least two subpixel separation sequences;
- a first generation unit configured to generate first display data for enabling the at least two subpixel separation sequences to be in the dark state during the display;
- a second generation unit configured to process display data corresponding to a subpixel display sequence between the two adjacent subpixel separation sequences with a rendering algorithm, so as to generate second display data; and
- a second replacement unit configured to replace data in the source display data corresponding to the at least two subpixel separation sequences and data corresponding to the subpixel display sequence with the first display data and the second display data respectively, so as to acquire the target display data.

19. The naked-eye 3D display processing device according to claim 14, further comprising:
- a detection module configured to detect viewing positions of a left eye and a right eye of a user; and
- a determination module configured to determine the at least two subpixel separation sequences in accordance with the viewing positions.

20. A display device, comprising the naked-eye 3D display processing device according to claim 14.

* * * * *